United States Patent [19]
Utoh et al.

[11] Patent Number: 4,776,120
[45] Date of Patent: Oct. 11, 1988

[54] DISPLAY DEVICE FOR TELEPHONE OR A SIMILAR ELECTRIC APPLIANCE

[75] Inventors: Yoshihiro Utoh; Shinichi Shibata, both of Hino, Japan

[73] Assignee: Kabushiki Kaisha Toshiba, Kawasaki, Japan

[21] Appl. No.: 709,797

[22] Filed: Mar. 8, 1985

[30] Foreign Application Priority Data

May 29, 1984 [JP] Japan ............................ 59-108925

[51] Int. Cl.⁴ ............................................. G09F 13/18
[52] U.S. Cl. ............................... 40/546; 40/564; 362/24; 362/26
[58] Field of Search ............... 40/330, 331, 573, 546; 362/24, 26

[56] References Cited

U.S. PATENT DOCUMENTS

| | | | |
|---|---|---|---|
| 2,159,095 | 5/1939 | Madan | 40/546 |
| 2,561,885 | 7/1951 | Prideaux et al. | 40/546 |
| 2,999,148 | 9/1961 | Kay | 40/546 |
| 3,144,643 | 8/1964 | Andersson | 40/546 |
| 3,406,475 | 10/1968 | O'Donnell | 40/546 |
| 3,664,047 | 5/1972 | Ruppert | 40/546 |
| 4,151,582 | 4/1979 | Grumberger | 40/546 |

FOREIGN PATENT DOCUMENTS

| | | |
|---|---|---|
| 816795 | 5/1937 | France ............................ 40/546 |
| 593054 | 11/1947 | United Kingdom . |
| 1300057 | 12/1972 | United Kingdom . |
| 2027551 | 3/1978 | United Kingdom . |
| 2038527 | 7/1980 | United Kingdom . |
| 2043979 | 10/1980 | United Kingdom . |
| 2065373 | 6/1981 | United Kingdom . |

*Primary Examiner*—Gene Mancene
*Assistant Examiner*—Wenceslao J. Contreras
*Attorney, Agent, or Firm*—Finnegan, Henderson Farabow, Garrett and Dunner

[57] ABSTRACT

In a display device employable for telephone or the like electric appliance, a light permeable member with information carried thereon includes a first reflective portion at which a light beam emitted from a light source is reflected in the light permeable member in the radial direction relative to the optical axis of light beam from the light source and a second reflective portion at which a part of the reflected light beam moving in the light permeable member in the direction away from the information is reflected again to be transmitted to the latter. The information on the light permeable member can be clearly recognized by an user with the aid of the light beam which has been collected around the information after reflection at the first and second reflective portions.

7 Claims, 4 Drawing Sheets

DISPLAY DEVICE FOR TELEPHONE OR A SIMILAR ELECTRIC APPLIANCE

BACKGROUND OF THE INVENTION

1. Field of the Invention

The present invention relates to a display device preferably employable for a telephone or a similar electric appliance and more particularly relates to a display device for clearly displaying information on a light permeable member with the aid of a light beam transmitted through the light permeable member from a light source such as light emitting diode, small lamp.

2. Description of the Related Art

To facilitate understanding of the present invention a typical conventional display device usable for a telephone will be described below with reference to FIGS. 1 and 2.

To assure that the telephone 1 is operated by depressing dial buttons 2 without any particular difficulty in a dark room or the like location, the dial buttons 2 are light permeable members made of translucent resin. The members lighted are from one side by a light beam transmitted from a light emitting diode 4 which is disposed in a casing 3 of the telephone 1 as illustrated in FIG. 2. Information 5 on the upper surface of the dial buttons 2 (see FIG. 1) is visually recognized by an user with the aid of part of a light beam (emitted from the light emitting diode 4 in the direction as identified by arrow marks in FIG. 2). This part of the light beam is dispersed upwardly in each of the dial buttons 2. The information 5 in FIG. 1 includes a letter, figure, symbol or a combination of such elements.

The conventional display device is constructed in the above-described manner such that the dial buttons 2 constituted by a light permeable member of translucent resin are lighted from the light beam transmitted from the light emitting diode 4 so that the information 5 on the upper surface of the dial buttons 2 is visually recognized by an user with the aid of a part of light beam (as identified by arrow marks A in FIG. 2). A drawback of the conventional display device that the intensity of light beam recognizable on the surface with information 5 is less than that of light beam (as identified by arrow marks A in FIG. 2) transmitted to the side wall of the dial buttons 2, resulting in reduced lighting efficiency. Thus, the information 5 often fail to be recognized clearly.

Further, in the conventional display device, this tendency of reduced lighting efficiency is remarkable particularly due to the fact that the telephone 1 is operated merely with power supply from a telephone cable, and therefore it is difficult to supply the display device with a sufficiently high intensity of light to allow an user to operate the telephone 1 in a dark room or similar location.

SUMMARY OF THE INVENTION

Thus, the present invention has been made with the foregoing background in mind. An improved display device according to the invention is entirely free from the drawbacks of conventional devices such that it is possible to clearly recognize information on a light permeable member constituting the display device by using a light source having a small capacity of light emission. Specifically, the present invention includes a light permeable member with a first reflective portion at which a light beam emitted from the light source is dispersed in the light permeable member and a second reflective portion at which a part of a reflected light beam moving away from the information is reflected again to be transmitted to the information. Thus, the display device of the invention assures that a light beam emitted from the light source is transmitted to the information via both the first and second reflective portions at a high optical efficiency.

It is an object of the present invention to provide an improved display device which assures that information on the light permeable member is clearly recognized by an user with the aid of a light beam tranmitted from a light source having a small capacity of light emission at a high optical efficiency.

It is another object of the present invention to provide an improved display device which assures that a light beam is transmitted through the light permeable member to information at a high optical efficiency irrespective of the fact that a light source emitting directional light beams is mounted with some positional error.

It is still another object of the present invention to provide an improved display device in which information is provided on the light permeable member which are visually recognized more clearly by an user with the aid of light beam transmitted from light source at a high optical efficiency in that way.

Other objects, features and advantages of the present invention will become more clearly apparent from reading of the following description which has been prepared in conjunction with the accompanying drawings.

BRIEF DESCRIPTION OF THE DRAWINGS

The accompanying drawings will be briefly described below.

DESCRIPTION OF THE PREFERRED EMBODIMENT

Now, the present invention will be described in a greater detail hereunder with reference to FIGS. 3 to 10(b) which illustrate a preferred embodiment thereof.

Figure 1:
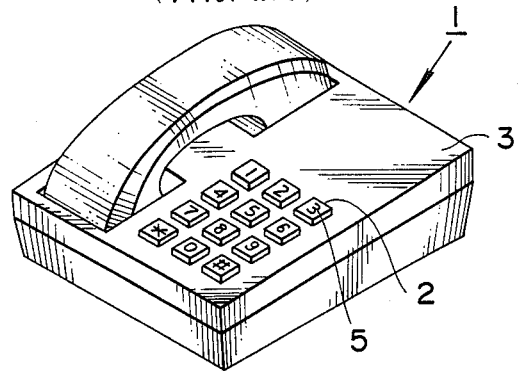
FIG. 1 is a perspective view of a telephone with a conventional display device.
Figure 2:
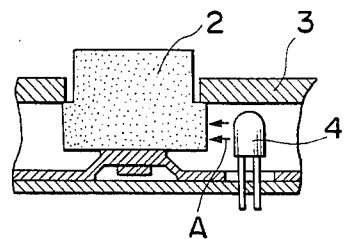
FIG. 2 is a fragmental vertical sectional view of part of the conventional display device, shown in an enlarged scale.
Figure 3:
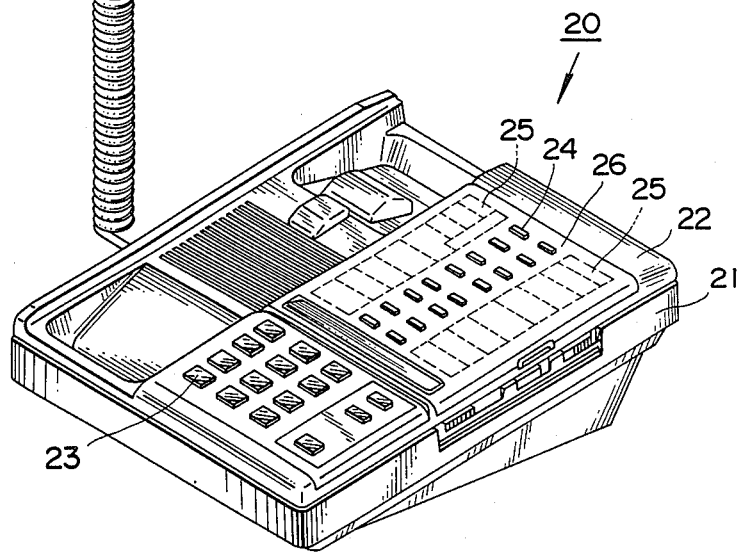
FIG. 3 is a perspective view of a telephone with a display device according to the invention.
Figure 4:
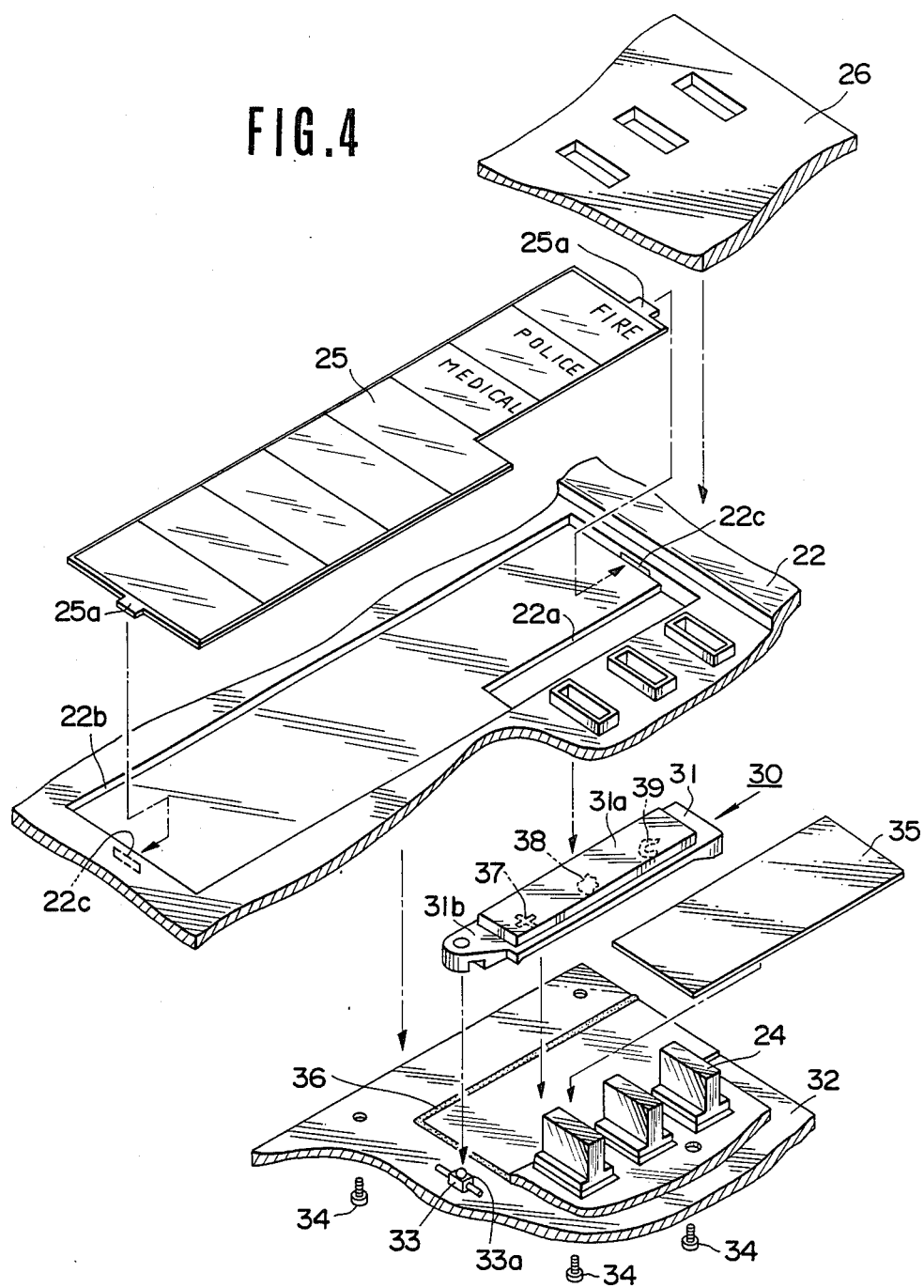
FIG. 4 is a perspective view of part of the display device in FIG. 3, shown in the disassembled state.

A telephone 20 with a display device according to the present invention is schematically illustrated in FIG. 3. A casing 21 constituting the telephone 20 includes an upper cover 22 on which a group of dial buttons 23, two lines of function buttons 24 performing abbreviated dial operation or the like and two lines of writing panel 25 for writing thereon information such as the abbreviated dial number, client name or the like, and are arranged in accordance with the illustrated layout. As is apparent from the drawing, one writing panel 25 is located on the lefthand side of the function buttons 24, the other one being on the righthand side of the same and they are covered with transparent cover 26. Further, the display device 30 of the invention is housed in the casing 21 at the position located below the writing panels 25, as illustrated in FIG. 4.

The display device 30 includes a light permeable member 31 made of transparent resin which is fitted into a slot 22a on the upper cover 22 to be firmly held therein. The upper cover 22 is formed with a recess 22b so as to allow the writing panel 25 to be fitted into the recess 22b. As is apparent from FIG. 4, the writing panel 25 is firmly held in the recess 22b by engaging projections 25a into slots 22c. Further, a circuit board 32 is disposed below the upper cover 22 so that a light emitting diode 33 serving as an essential component for the display device 30, a plurality of function buttons 24 and others are arranged at predetermined positions on the circuit board 32 which is fixedly secured to the upper cover 22 by means of set screws 34. The light emitting diode 33 is immovably mounted on the circuit board 32 in such manner that its light emitting portion 33a is oriented upwardly. In FIG. 4, reference numeral 35 designates a sheet to be located on the bottom of the light permeable member 31 to create background color for the latter. The sheet 35 is usually made of paper or the like material. Alternatively, the sheet 35 may be replaced with a layer of resist coated on the circuit board 32. Further, reference numeral 36 designates a pattern made of copper foil which serves to define the boundary along which the sheet 35 is to be adhesively secured to the circuit board 32. The light permeable member 31 is formed with a reflective portion 31b at the position located opposite to the light emitting portion 33a of the light emitting diode 33 so that light beam emitted from the light emitting portion 33a is transmitted to a plurality of information 37, 38 and 39 via the reflective portion 31b at which light beam is caused to reflect. In the illustrated embodiment, the information 37, 38 and 39 are provided on the light permeable member 31 by silk printing process.

Figure 5:
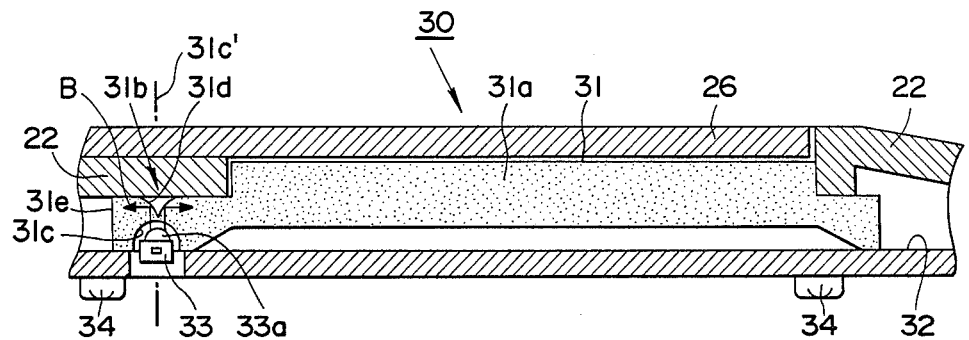
FIG. 5 is a fragmental vertical sectional view of the display device of the invention, particularly illustrating the light permeable member constituting the display device.
Figure 6:
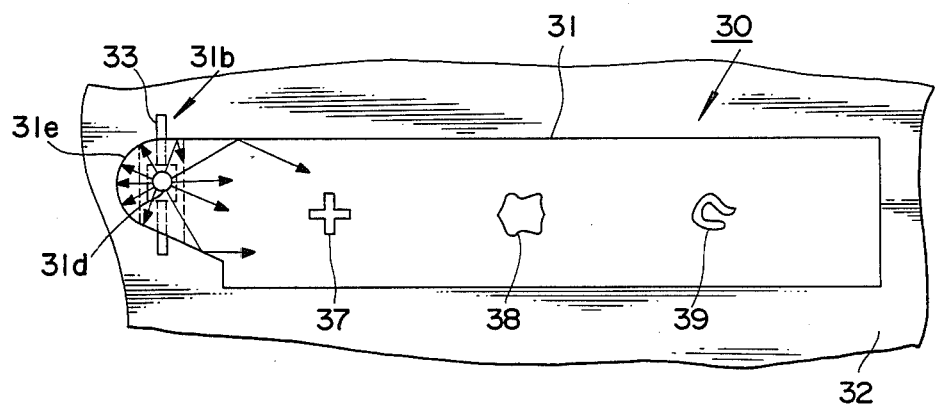
FIG. 6 is a plan view of the light permeable member in FIG. 5, and FIGS. 7(a) and (b) to 10(a) and (b) are a combination of fragmental plan view and vertical sectional view respectively, particularly illustrating several examples of information on the light permeable member.

As illustrated in FIG. 5, the reflective portion 31b is provided on the bottom part of the light permeable member 31 and essentially comprises a semi-spherical recess 31c adapted to house therein the light emitting portion 33a of the light emitting diode 33, a recess 31d having an inverted conical configuration and a side wall surface 31e having an arched configuration as seen from the above. Specifically, the recess 31d serving as a first reflective portion is formed on the upper surface of the light permeable member 31 at the position located directly above the semi-spherical recess 31c and has a center axis 31c' which extends coaxially relative to the axis of the spherical recess 31c. It should be noted that the diverged surface of the recess 31d is gradually curved toward the informations 37, 38 and 39 on the light permeable member 31. On the other hand, the side wall surface 31e serving as a second reflective portion has a center axis identical to the center axis 31c' of the semi-spherical recess 31c, as is best seen in FIG. 6.

Next, the operation of the display device 30 as constructed in the above-described manner will be described below.

Referring to FIG. 5 again, a light beam emitted in the upward direction from the light emitting diode 33 enters into the light permeable member 31 without any occurrence of reflection at the semi-spherical recess 31c and it is then reflected in the radial direction relative to the optical axis of light beam emitted from the light emittng diode 33, that is, in the horizontal direction along the inverted conical surface of the recess 31d whereby the direction of transmission of light beam is changed by 90 degrees (as represented by arrow marks B). A part of the light beam reflected in the horizontal direction exclusive of the reflected light beam oriented toward the main body 31a of the light permeable member 31 is caused to move toward the side wall surface 31e. Since the side wall surface 31e serving as the second reflective portion has an arched configuration as illustrated in FIG. 6, the direction of light beam is changed when the light beam is reflected on the side wall surface 31e. Thus, owing to the arrangement of the first and second reflective portions made in that way, light beam which has entered into the light permeable member 31 is fully collected in the area as defined by the main body 31a. Light beam collected at the main body 31a is then caused to collide against the informations 37, 38 and 39 on the surface of the main body 31a of the light permeable member 31 whereby they are lighted.

Since the light beam emitted from light source such as light emitting diode or the like means is oriented toward the main body constituting the light permeable member via reflective portions provided on a part of the light permeable member in the above-described manner, it is assured that the light beam is transmitted to required position without fail irrespective of the fact that light source is mounted with some unintentional error during assembling, maintaining or inspecting operation. As a result, informations on the light permeable member are lighted at a high optical efficiency.

Finally, description will be briefly made as to the structure of the information 37, 38 and 39 as illustrated in the foregoing drawings.

Figure 7A:
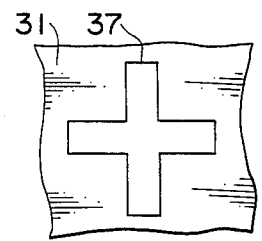
Figure 7B:
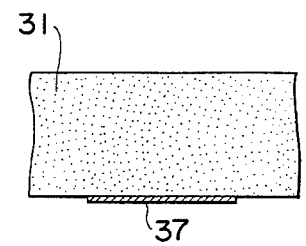

Information as typically identified by reference numeral 37 in FIGS. 7(a) and (b) is provided on the light permeable member 31 by printing process such as silk printing process, pad printing process, hot stamping process or the like.

Figure 8A:
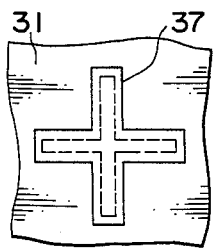
Figure 8B:
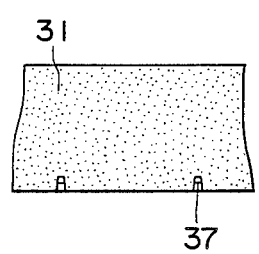

Information 37 as illustrated in FIGS. 8(a) and (b) is prepared by engraving grooves along the outer periphery of the information 37 and filling them with paint having a specific color.

Figure 9A:
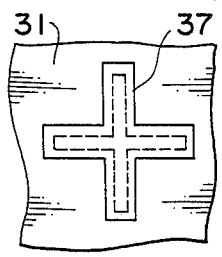
Figure 9B:
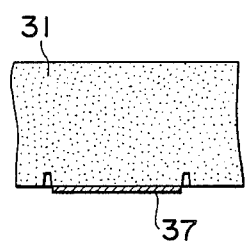

Information 37 as illustrated in FIGS. 9(a) and (b) is prepared by engaving grooves along the outer periphery of the information 37 and covering the pattern of the latter defined inside the grooves with a layer of printed film.

Figure 10A:
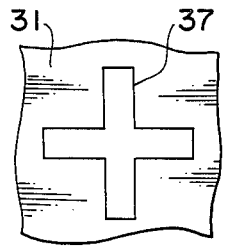
Figure 10B:
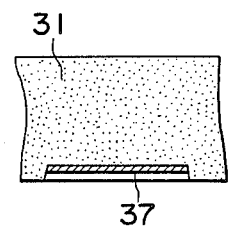

An information 37 as illustrated in FIGS. 10(a) and (b) is prepared by recessing the whole pattern of the information 37 below the surface of the light permeable member 31 and coating it with paint having a specific color.

As will be readily understood from this description, arrangement of grooves along the outer periphery of an information and preparation of an information in the recessed structure cause reflection of light beam along the outer periphery of an information, resulting in each of the information being visually recognized clearly.

While the present invention has been described above with respect to the illustrated embodiment in which the light emitting diode 33 and the reflective portion 31b are located on the lefthand side of the light permeable member 31 as seen in FIGS. 5 and 6, it should be understood that the present invention is not limited to this, but may be located at any required position on the light permeable member 31 as far as they function properly. In accordance with the present invention, the light beam emitted from the light emitting diode 33 is oriented toward the main body of the light permeable member with information carried thereon via reflective portions.

It should be noted that the present invention may be embodied in any acceptable manner without departure from the claimed features of the invention. Therefore, the foregoing embodiments are illustrative and are not limiting. The scope of the invention is as defined by the appended claims and their equivalents. Further, it should be noted that all changes or modifications made without departure from the scope of the invention should be construed to be included within the scope of the invention.

What is claimed is:

1. A dial illuminator, comprising:

a light permeable member including an upper face, a lower face opposing said upper face and a side face, said light permeable member having information to be illuminated formed on a portion of said upper face;

a recess formed in said lower face between said side face and said information to be illuminated;

a light source disposed in said recess, said light source emitting light toward said upper face of the light permeable member and having an optic axis perpendicular to said upper face;

first reflective means including a horn-shaped projection having a central axis, said horn-shaped projection being formed on said upper face and projecting along the central axis from said upper face inwardly toward said lower face substantially coincident with said optic axis, said horn-shaped projection having a substantially inverted triangular shape with oblique sides being curved inwardly toward said central axis, said first reflective means reflecting light from said light source in all radial directions from said central axis; and second reflective means formed on said side face of said light permeable member, said second reflective means having a wall portion of an arched configuration with a center axis thereof being substantially coincident with said optic axis and operating to receive light reflected by said first reflective means in directions away from said information and re-reflecting said reflected light toward said information, said information thereby being illuminated by light directly from the light source and light reflected by both said first and said second reflective means.

2. A dial illuminator as defined in claim 1, wherein said light source comprises a light emitting diode.

3. A dial illuminator as defined in claim 1, wherein said information is comprised of printed indicia disposed on the first portion of the upper face.

4. A dial illuminator as defined in claim 1, wherein said information has a periphery defined by grooves in the first portion of the upper face and coloring means disposed in said grooves.

5. A dial illuminator as defined in claim 4, wherein said information is comprised of printed indicia disposed on the first portion of said upper face, and grooves formed in the upper face surrounding the printed indicia.

6. A dial illuminator as defined in claim 1, wherein said information is comprised of a recessed area formed in the upper face and having a configuration corresponding to the information, and coloring means disposed in the recessed area.

7. A dial illuminator as defined in claim 1, wherein said horn-shaped projection is located at a position opposite said light source.

* * * * *